US009466152B2

(12) United States Patent
Grosse-Laxzen et al.

(10) Patent No.: US 9,466,152 B2
(45) Date of Patent: Oct. 11, 2016

(54) METHOD FOR DETERMINING THE SUCTION MASS FLOW OF A GAS TURBINE

(75) Inventors: Rolf Grosse-Laxzen, Rangsdorf (DE); Klaus Werner, Goch (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1356 days.

(21) Appl. No.: 12/934,358

(22) PCT Filed: Mar. 24, 2009 (Under 37 CFR 1.47)

(86) PCT No.: PCT/EP2009/053440
§ 371 (c)(1), (2), (4) Date: Feb. 15, 2011

(87) PCT Pub. No.: WO2009/118311
PCT Pub. Date: Oct. 1, 2009

(65) Prior Publication Data

US 2011/0247406 A1 Oct. 13, 2011

(30) Foreign Application Priority Data

Mar. 28, 2008 (EP) .................................... 08005950

(51) Int. Cl.
*G01M 15/00* (2006.01)
*G07C 3/00* (2006.01)
*F01D 25/00* (2006.01)

(52) U.S. Cl.
CPC ............... *G07C 3/00* (2013.01); *F01D 25/002* (2013.01); *F05D 2270/44* (2013.01); *F05D 2270/708* (2013.01); *F05D 2270/71* (2013.01)

(58) Field of Classification Search
CPC .................................................... F01D 25/002
USPC ........................................................... 73/112
See application file for complete search history.

(56) References Cited

U.S. PATENT DOCUMENTS 5,048,285 A * 9/1991 Schmitt et al. ................. 60/204
5,113,691 A * 5/1992 Martin et al. .............. 73/112.01

(Continued)

FOREIGN PATENT DOCUMENTS

CN 1228507 A 9/1999
RU 2123610 C1 12/1998

(Continued)

OTHER PUBLICATIONS

Richard S. Mah, Gregory M. Stanley, and Dennis M. Downing, “Reconciliation and Rectification of Process Flow and Inventory Data”, Industrial Eng Chem Process Design and Development, vol. 15, No. 1, 1976, pp. 175-183.*

(Continued)

*Primary Examiner* — Lisa Caputo
*Assistant Examiner* — Nasir U Ahmed

(57) ABSTRACT

A method for determining a suction mass flow of a gas turbine is provided. A turbine inlet pressure, a combustion chamber pressure loss and a pressure loss between an environment and a compressor inlet are determined as input parameters. For each input parameter a provisional value for the suction mass flow is ascertained and for each provisional value a validated value by cross-balancing with the other provisional values is ascertained. A characteristic quantity of the suction mass flow of the gas turbine is generated as an average value from the validated values. The suction mass flow is determined without solving energy balances, without information relating to a fuel calorific value, and without information relating to a fuel mass flow.

12 Claims, 3 Drawing Sheets

(56) References Cited

U.S. PATENT DOCUMENTS

| | | | | |
|---|---|---|---|---|
| 5,559,691 | A * | 9/1996 | Monta et al. | 700/83 |
| 5,715,178 | A * | 2/1998 | Scarola et al. | 702/116 |
| 6,119,448 | A * | 9/2000 | Emmerling et al. | 60/274 |
| 6,381,945 | B2 * | 5/2002 | Werner | 60/782 |
| 6,574,584 | B2 * | 6/2003 | Yeung et al. | 702/179 |
| 6,598,399 | B2 * | 7/2003 | Liebig | 60/772 |
| 6,976,351 | B2 * | 12/2005 | Catharine et al. | 60/39.281 |
| 7,021,126 | B1 * | 4/2006 | Badami et al. | 73/112.03 |
| 7,178,351 | B2 * | 2/2007 | Varney | 62/178 |
| 7,231,305 | B2 * | 6/2007 | Stephenson et al. | 702/45 |
| 7,946,157 | B2 * | 5/2011 | Habets | 73/112.01 |
| 2006/0218939 | A1 * | 10/2006 | Turner et al. | 62/4 |

FOREIGN PATENT DOCUMENTS

| | | | |
|---|---|---|---|
| RU | 2146012 | C1 | 2/2000 |
| WO | WO 9516296 | A1 | 6/1995 |
| WO | WO 2005090764 | A1 | 9/2005 |

OTHER PUBLICATIONS

International Standard, "Measurement of fluid flow by means of pressure differential devices inserted in circular cross-section conduits running", ISO 5167-1, Second edition, Mar. 1, 2003.*

Schepers W et al: "Optimierung der On-Line und Off-Line-Wäsche an Einer 26-MW-Gasturbine Unter Besonderer Berücksichtigung der Leistungssteigerung"; VGB Kraftwerkstechnik GmbH, Essen, Germany, vol. 79, No. 3, Jan. 1, 1999; pp. 46-54; XP000802562; ISSN: 0372-5715.

Basendwah A A et al: "Turbine Off-Line Water Wash Optimization Approach for Power Generation"; ASME Turbo Expo 2006, vol. 4, May 11, 2006; pp. 65-76; New York; XP009105187.

Orth J. et al: "Integration von Systemen für Monitoring, Diagnose und zustandsorientierte Instandhaltung in thermischen Kraftwerken"; Elektrotechnik und Informationstechnik, Springer Verlag, Wien, Austria, vol. 115, No. 10; Jan. 1, 1998; pp. 549-554, XP000865092, ISSN: 0932-383X.

Kim S-M. et al: "Implementation of on-line performance monitoring system at Seoincheon and Sinincheon combined cycle power plant"; Energy, Pergamon Press, Oxford, Great Britain, vol. 30, No. 13; Oct. 1, 2005; pp. 2383-2401, XP004780014, ISSN: 0360-5442.

Prof. Carl-Johan Fogelholm, Aaalto Universität Helsinki, Finnland, HTU Lehrbuch, Ene-47.121: "Turbine Technology", pp. 1-36; 2001; FI; Dec. 31, 2001.

VDI Handbuch Energietechnik, Verein Deutscher Ingenieure, "Messunsicherheit bei Abnahmemessungen an energie- und kraftwerkstechnischen Anlagen Grundlagen", Part 1, pp. 1 to 88, "Messunsicherheiten bei Abnahmemessungen an energie- und kraftwerkstechnischen Anlagen Beispiele, insbesondere Retrofitmaßnahmen", Part 2, pp. 1 to 59; 2000; DE; Oct. 1, 2000.

* cited by examiner

METHOD FOR DETERMINING THE SUCTION MASS FLOW OF A GAS TURBINE

CROSS REFERENCE TO RELATED APPLICATIONS

This application is the US National Stage of International Application No. PCT/EP2009/053440 filed Mar. 24, 2009, and claims the benefit thereof. The International Application claims the benefits of European Application No. 08005950.4 EP filed Mar. 28, 2008. All of the applications are incorporated by reference herein in their entirety.

FIELD OF INVENTION

The invention relates to a method for determining the suction mass flow of a gas turbine. It relates, further, to a method for diagnosing a gas turbine comprising a plurality of components, in which the additional power, by the amount of which the operating power of the gas turbine would be increased in the event of a cleaning of one of the components, is automatically predicted.

BACKGROUND OF INVENTION

In a gas turbine, during the running time, its power and efficiency decrease due to contamination, deposits, erosion and corrosion, with the result that the overall power station process is adversely influenced. Especially the aerodynamic parts of the compressor at the inlet of the gas turbine are in this case affected.

The contamination of the gas turbine is caused by the adhesion of particles to the surfaces. Oil and water mists contribute to the possibility of dust and aerosols settling on the blades. The contaminations and deposits occurring most frequently are mixtures of wettings with water and water-soluble and water-insoluble materials. In the gas turbine, contaminations due to ash deposits and unburnt solid cleaning preparations may occur. Such air pollutants adhere in the manner of scales to the components of the flow path of the gas turbine and react with them. Further, grazings due to the impact of particles and to abrasion occur and are generally designated as erosion.

Furthermore, ice fragments which form at the inlet of the gas turbine may come loose and strike the components in the flow path of the gas turbine. In order to prevent this, an anti-icing system, as it is known, is employed. Air preheating, here, prevents the situation where the temperature of the air upon entry into the gas turbine does not fall below the freezing point and therefore the water does not freeze.

Owing to the ageing processes described, increased surface roughness of the blades is caused. This leads to comparatively high frictional losses in the gas turbine, since laminar boundary layer flows may change over to a turbulent flow, thus resulting in growing flow resistance. Furthermore, gaps in the gas turbine increase in size due to abrasion and corrosion. The losses caused by the increased gap flow rise, and the performance of the plant decreases.

The influence of ageing phenomena is especially high at the inlet of the gas turbine, which is the compressor. Geometric variations in the blades due to erosion, deposits and damage bring about a reduced performance of the gas turbine. Deposits, erosion and corrosion occurring at the inlet lead to modified inlet angles which have a very pronounced effect on the thermodynamic performance. An aged compressor may sometimes lead to flow stalling.

The aging of the compressor has an adverse effect on the gas turbine efficiency, gas turbine power output and gas turbine outlet mass flow. In order to counteract the reduction in power of the turbine plant, regular compressor scrubs are carried out. Compressor blades may in this case be scrubbed in the online and offline mode. In the online mode, the turbine plant continues to operate during cleaning, and the gas turbine load is lowered only slightly. Online scrubs are employed mainly to avoid the build-up of the dirt layer. An online scrub is usually carried out once a day with fully demineralized water and every third day with cleaning agents.

By contrast, for an offline scrub, the plant is shut down. In order to avoid thermal stresses, it is cooled for six hours with the aid of a shaft rotation device. An offline scrub is usually carried out about once a month. If the turbine plant has not been cleaned for a comparatively long period of time, an offline scrub has to be carried out, as a rule, for typical plants, since the method of online cleaning can no longer remove the dirt.

An offline scrub in this case brings about a greater recovery of power than an online scrub. With the aid of an offline scrub, power recoveries of several percent can be achieved. An online scrub brings about a lower power recovery. The most effective blade cleaning can be obtained by means of a combination of online and offline scrubs. A regular online scrub extends the time intervals between the required offline scrubs.

The optimal time point for an offline scrub is often determined by the operator according to purely economic operating factors, for example in off-peak periods. This means that the decision on the time point for eliminating a contamination of one of the components of the turbine plant, for example by means of a scrub of the compressor, is based solely on empirical values from economic standpoints or from preliminary studies with fixed boundary conditions.

Alternatively, the determination of the time point of the offline scrub may take place on the basis of a current prediction of the power gain of the gas turbine expected as a result of the offline scrub. In this case, such a prediction is usually made on the basis of the development of the compressor efficiency of the gas turbine which serves as a characteristic quantity for the intensity of contamination of the compressor. Such predictive methods are known, for example, from WO 2005/090764 A or from Schepers et al.: "Optimierung der Online- and Offline-Wäsche an einer 26-MW-Gasturbine unter besonderer Berücksichtigung der Leistungssteigerung"["Optimization of the online and offline scrub on a 26-MW gas turbine, taking particular account of the power increase"], VGB Kraftwerkstechnik, Vol. 79 No. 3.

However, the measurement data used for determining the compressor efficiency may have comparatively high data uncertainties, thus making it more difficult to conduct an exact prediction of the power gain expected as a result of an offline scrub and, consequently, a determination of the time point, cost-optimal for operating the gas turbine, for such an offline scrub.

To increase the accuracy of a prediction of this kind, the statistical uncertainties should in this case be minimized. This may take place, for example, by means of an improvement in the measurement apparatus or an increase in the number of measurements. In this case, however, such an increase only leads to a reduction in the statistical error, but systematic errors in the prediction of the additional power should also largely be minimized. This can be achieved by additionally adopting further characteristic quantities for predicting the additional power. Such a quantity which is characteristic of the power of the gas turbine is the suction mass flow of the gas turbine.

The suction mass flow as a characteristic quantity for the operating power of the gas turbine is usually not measured directly on account of the high outlay, the high measurement uncertainty and the risk of damage, but, instead, is determined indirectly by means of assessments. For a direct measurement, highly complicated instruments would have to be used, since, firstly, there are very high temperatures and, secondly, it is absolutely essential to prevent the sensors from breaking off because of the probably high consequential damage to the turbine blading.

SUMMARY OF INVENTION

An object of the claimed invention is to specify a method for determining the suction mass flow of the abovementioned type, which allows an especially reliable prediction of the power gain to be expected in the event of cleaning.

This object is achieved, in that, to determine the suction mass flow, the turbine inlet pressure, the combustion chamber pressure loss and/or the pressure loss between the surroundings and the compressor inlet are ascertained as input characteristic quantities.

The invention in this case proceeds from the consideration that, for an energy balance of the overall gas turbine, on the one hand, and of the combustion chamber, on the other hand, inter alia the operating power, the fuel mass flow and the fuel calorific value are required as input quantities. However, these values are comparatively difficult to determine and have a very high degree of error. In a combined-cycle power station in which a gas turbine is operated together with a steam turbine on one shaft, moreover, the power of the gas turbine as an individual value can be determined only in a comparatively complicated way and inaccurately, since only the overall power of the entire combined-cycle power station is available at all times. Consequently, to deter mine the suction mass flow, the turbine inlet pressure, the combustion chamber pressure loss and/or the pressure loss between the surroundings and the compressor inlet are ascertained as inlet characteristic quantities.

In this case, the turbine inlet pressure can be converted with the aid of Stodola's quantity/pressure equation into a value for the suction mass flow, while in each case resistance coefficients can be ascertained from the combustion chamber pressure loss and the pressure loss between the surroundings and the compressor inlet and can be employed in order to determine the suction mass flow. Such ascertaining of the suction mass flow without solving an energy balance is subject to substantially lower statistical errors and therefore allows an even more accurate prediction of the additional power, by the amount of which the operating power of the gas turbine would be increased in the event of a cleaning of one of the components.

In order to minimize the statistical errors further in determining the suction mass flow, in order to determine the suction mass flow, advantageously in each case a provisional value for the suction mass flow is ascertained from a number of input characteristic quantities, in each case a validated value being ascertained for each provisional value by cross-balancing with the other provisional values in each case. Such cross-balancing may take place, for example, on the basis of VDI2048. This is based essentially on the Gaussian equalization principle, the basic idea of which is not only to use the minimum amount of measurement quantities which is required for a solution, but, furthermore, to acquire all achievable measurement quantities together with the associated variances and covariances. For the present method, this means that all achievable input characteristic quantities are used in order in each case to ascertain a provisional value for the suction mass flow.

Since it is always a question of the same physical suction mass flow, the true values of the input characteristic quantities should be such that all the provisional values occurring are identical. On the basis of this assumption, with the aid of the Gaussian method contradiction-free estimated values for the actual values of the measurement quantities and validated values for the suction mass flow are obtained. The validated values for the suction mass flow which are generated in this way are then averaged and thus form a characteristic quantity, having an especially low statistical error, for determining the operating power of the gas turbine.

The selection of the time point for an offline scrub at especially low costs which is necessary for obtaining a high operating power of the gas turbine can be achieved by means of as exact a prediction of the power gain as possible as a result of such an offline scrub of the gas turbine. In other words, in order to find whether an offline scrub at the current time point pays for itself in light of the production outage due to the shutdown of the gas turbine, it should be known at any time, as exactly as possible, how high the expected power recovery due to the offline scrub is. Consequently, in a method for diagnosing a gas turbine comprising a plurality of components, which makes such a prediction with the aid of work of the suction mass flow, the above method for determining the suction mass flow should advantageously be adopted.

In a gas turbine, the compressor precedes all the other structural parts, such as, for example, the combustion chamber, on the flow medium side. Correspondingly, the compressor is the structural part most exposed to the environmental influences, such as incoming dust and dirt particles. Advantageously, therefore, in particular a cleaning of the compressor is carried out, since the latter has the highest degree of contamination and therefore corresponding cleaning has an especially positive influence on the recovery of operating power of the gas turbine.

For a further reduction in the statistical and systematic error of the gas turbine, the suction mass flow should not be provided as the sole characteristic quantity for determining the operating power of the gas turbine. In an advantageous refinement, therefore, the compressor efficiency of the gas turbine is additionally used as a characteristic quantity.

The measurement of the input characteristic quantities should take into account the fact that, in particular, thermodynamic parameters of the gas turbine are dependent on the respective ambient conditions, such as air pressure and outside temperature. So that measured values can nevertheless be compared with one another at different time points, the respective characteristic quantities should be standardized on the basis of reference conditions. An appropriate standard in this case is the ISO conditions (temperature 15° C., pressure 1.013 bar, air humidity 60%).

In order, from the calculated instantaneous operating power of the gas turbine, to predict the additional power in the event of a cleaning of one of the components of the gas turbine, a reference value is required for the operating power of a gas turbine just cleaned. In this case, the operating power of the gas turbine is dependent not only on its state of contamination, but also on the contamination-independent erosion and therefore essentially on the operational age of the gas turbine. In order to obtain such a reference value, advantageously characteristic quantities of structurally identical and/or structurally similar gas turbines are used as comparative quantities in the prediction of the additional power. As a result, in particular, the operating power after the cleaning of the gas turbine can be predicted especially well, and, overall, a more accurate prediction of the additional power as a result of a cleaning of the gas turbine can be achieved.

The additional power due to a cleaning of one of the components of the gas turbine is often to be determined not only in the event of cleaning taking place immediately, but also for periods of time lying in the future, in order to allow a long-term planning of the cleaning operations. For this purpose, in an advantageous refinement, a prediction of the time development of the respective characteristic quantity is made. Such a prediction is possible by means of a plurality of evaluations of the input characteristic quantities or measured values at various time points.

Especially cost-optimal operation of the gas turbine is possible when a determination of the time point for an offline scrub of the gas turbine is not only carried out from purely economic standpoints, such as, for example, in off-peak periods, but also takes place on the basis of an exact prediction of the operating power of the gas turbine in future. For this purpose, advantageously, as a function of the value of the additional power ascertained, and weighing up the overall outlay in economic terms, it is determined whether the gas turbine is shut down temporarily in order to eliminate the contamination and, where appropriate, an optimal time point for the temporary shutdown is ascertained. As a result of an exact prediction of the additional power achieved by means of an offline scrub, the determination of a time point for such an offline scrub can take place on the basis of a substantially more accurate analysis in which costs and benefits of the offline scrub can be weighed up exactly in relation to one another.

Advantageously, the method is employed in a gas turbine plant with a gas turbine comprising a plurality of components and with a control system which is connected on the data input side to a number of sensors arranged in the gas turbine for ascertaining input characteristic quantities, the control system comprising a prediction module.

In an advantageous refinement, data from a database having comparative quantities of structurally identical and/or structurally similar gas turbines can be read into the prediction module. For this purpose, the prediction module should have a correspondingly open architecture which allows such a read-in. This may take place, for example, with the aid of a mobile data carrier or via a permanent data connection to the database, that is to say the database may be filed on a recordable memory within the control system or can be stored on an external server which is connected via a long-distance data line to the control system of the gas turbine.

This allows balancing between the data of structurally identical and/or structurally similar gas turbines, with the result that backup by an especially broad experimental base can occur and therefore a lower statistical error is achieved. Conversely, the data obtained in the gas turbine may also be used for extending the database, in that they are made available to the database and stored there.

Advantageously, a prediction module for use in a gas turbine plant is suitable for carrying out the method. The advantages achieved by means of the invention are, in particular, that, by determining the suction mass flow of the gas turbine by means of the turbine inlet pressure, the combustion chamber pressure loss and/or the pressure loss between the surroundings and the compressor inlet, a comparatively accurate analysis of the degree of contamination of the gas turbine, in particular of its compressor, is possible. It is thereby possible to carry out a predictive planning, adapted to the operational and economic circumstances, of the offline scrubbing of the gas turbine, with the result that an especially high efficiency of the gas turbine can be achieved during its running time. Moreover, the method described here makes it possible to determine the suction mass flow without any knowledge of the fuel data and without solving an energy balance associated with high uncertainties. Furthermore, it is consequently possible for the first time to take into account the suction mass flow in respect of the operating power of the gas turbine for single-shaft plants in which a gas turbine and a steam turbine are arranged on a common shaft.

BRIEF DESCRIPTION OF THE DRAWINGS

An exemplary embodiment of the invention is explained in more detail by means of a drawing in which.

Identical parts are given the same reference symbols in all the figures.

DETAILED DESCRIPTION OF INVENTION

Figure 1:
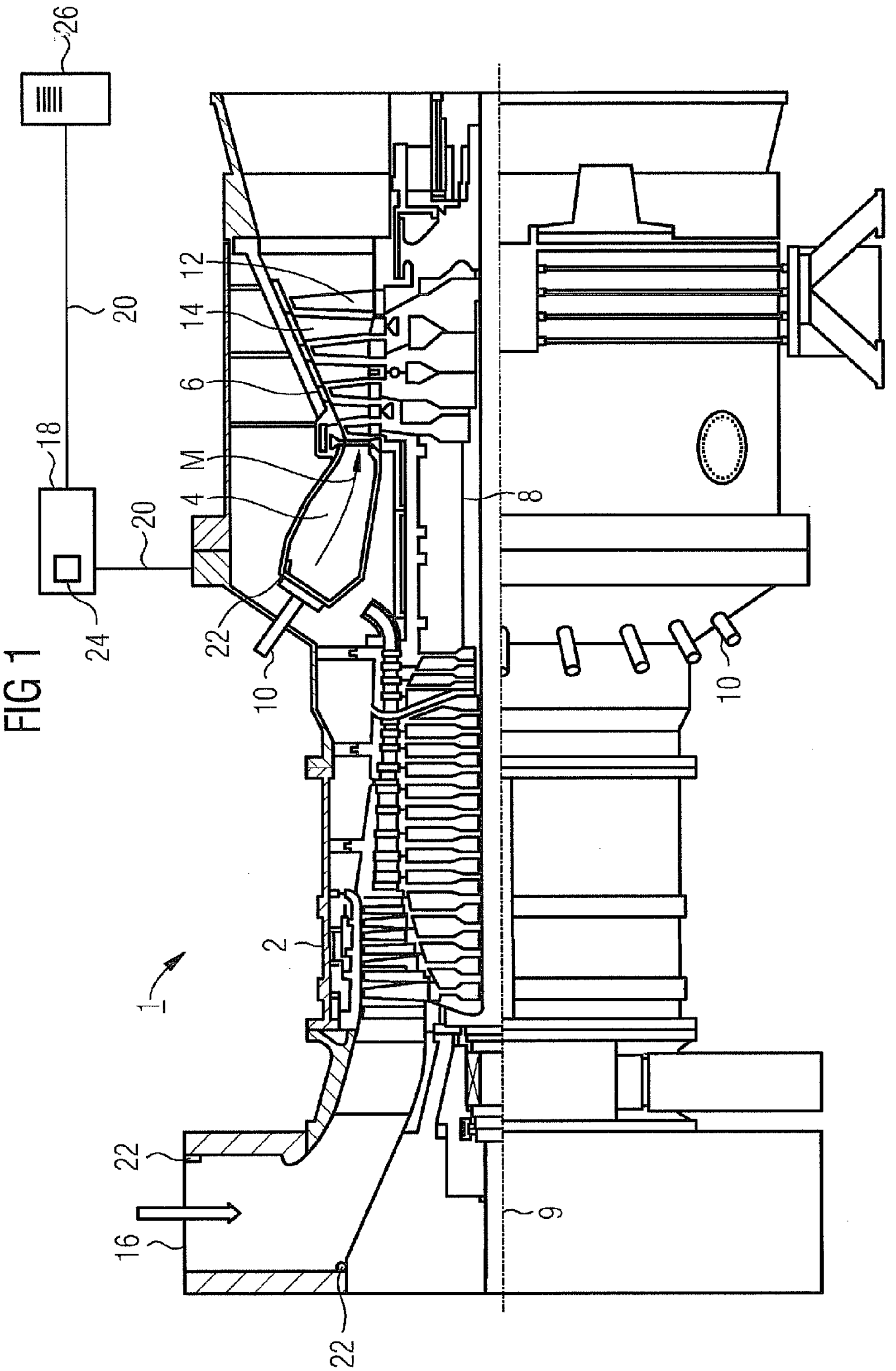
FIG. 1 shows a longitudinal section through a gas turbine.

The gas turbine 1 according to FIG. 1 has a compressor 2 for combustion air, a combustion chamber 4 and a turbine 6 for the drive of the compressor 2 and of a generator or a working machine, not illustrated in any more detail. For this purpose, the turbine 6 and compressor 2 are arranged on a common turbine shaft 8, also designated as a turbine rotor, to which the generator or the working machine is also connected and which is mounted rotatably about its mid-axis 9.

The combustion chamber arrangement 4 comprises a number of individual burners 10, arranged around the turbine shaft 8 in the form of a ring, for the combustion of a liquid or gaseous fuel.

The turbine 6 has a number of rotatable moving blades 12 connected to the turbine shaft 8. The moving blades 12 are arranged in the form of a ring on the turbine shaft 8 and thus form a number of moving blade rows. Furthermore, the turbine 6 comprises a number of stationary guide vanes 14 which are likewise fastened in the faint of a ring inside the turbine 6 so as to form guide vane rows. The moving blades 12 in this case serve for driving the turbine shaft 8 by the transfer of momentum from the working medium M flowing through the turbine 6. By contrast, the guide vanes 14 serve for routing the flow of the working medium M in each case between two moving blade rows or moving blade rings which follow one another, as seen in the flow direction of the working medium M.

The compressor 2 is that structural part of the gas turbine 1 which lies nearest to the air inlet 16. Correspondingly, it is exposed the most to the ingress of dirt and to the resulting contamination of the gas turbine 1. In order to prevent a reduction in the operating power of the gas turbine 1, therefore, the compressor 2 has to be cleaned regularly. In this case, online scrubs, as they are known, for which it is not necessary to shut down the gas turbine 1, can be carried out relatively frequently, for example once a day. For the removal of stubborn dirt, the turbine should be shut down at longer intervals in order to carry out an offline scrub.

The gas turbine 1 comprises a control system 18 which is connected via a data line 20 to various sensors 22 arranged inside the gas turbine 1.

To determine the optimal offline scrubbing time point, the control system 18 in this case comprises a prediction module 24 which processes the input characteristic quantities detected by the sensors 22 and, on the basis of these data, ascertains the degree of contamination of the gas turbine and the expected gain in operating power when an offline scrub has been carried out. To improve the prediction quality, comparative data of structurally identical or structurally similar gas turbines can be read into the prediction module. For this purpose, the control system is connected via a further data line 20 to a database 26 which contains such comparative data. The database 26 may in this case be located on an external database server, not shown in any more detail. Alternatively, the comparative data may also be read in via a mobile data carrier without a permanent data connection to the database 26.

Figure 2:
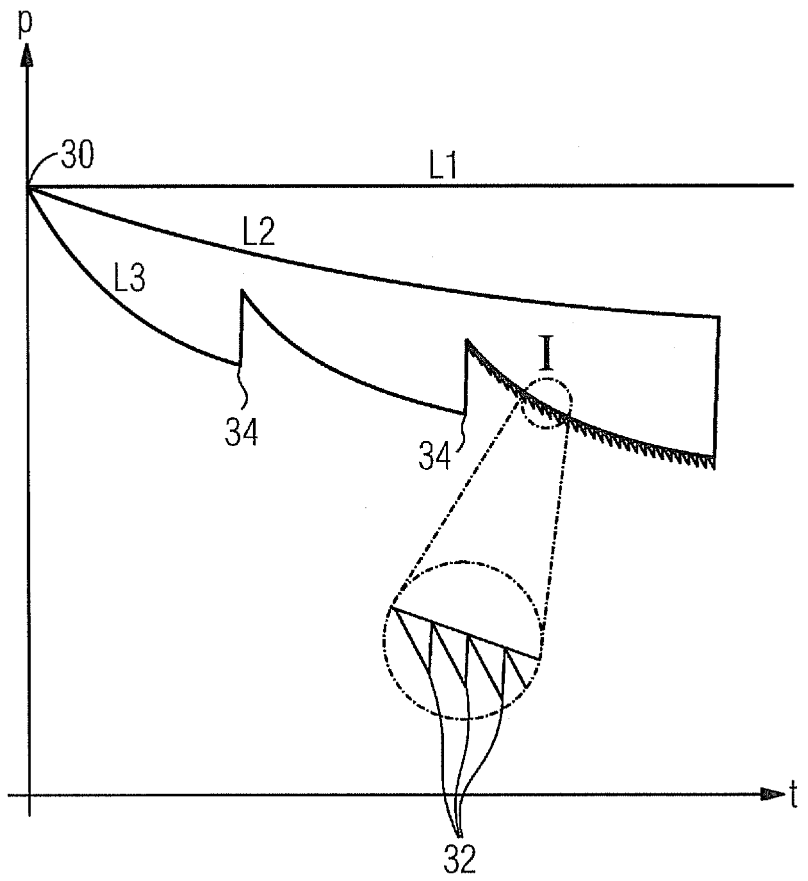
FIG. 2 shows a graph of the time profile of the operating power of a gas turbine.

FIG. 2 shows a graphical illustration of the time profile of the operating power of a typical gas turbine 1. The line L1 shows the operating power of the gas turbine 1 at the time point of commissioning 30. The line L2 shows the theoretical maximum power of the gas turbine over its running time, the drop in which is brought about solely due to ageing and irreversible contamination.

The line L3 shows the additional influence of reversible contamination on the operating power of the gas turbine. The detail I in this case shows the influence of the regular online scrub on the operating power of the gas turbine. This is carried out at regular intervals at a fixed time 32, for example once a day. This results in a comparatively small power increase which, however, added to the frequent online scrubs, contributes considerably to maintaining the power of the gas turbine 1.

Offline scrubs are carried out at longer time intervals at time points 34 to be determined. These offline scrubs result in a substantially greater recovery of power, but require a substantially higher outlay, since the gas turbine 1 has to be shut down, in which case a considerable cost outlay also arises. The time points 34 should therefore be selected predictively, and this may take place, on the one hand, on the basis of economic criteria, such as, for example, current price or fuel price, and, on the other hand, also on the basis of the operating variables of the gas turbine. In particular, the predicted power gain as a result of an offline scrub should be known for an optimal determination of the time point 34 of the offline scrub.

Figure 3:
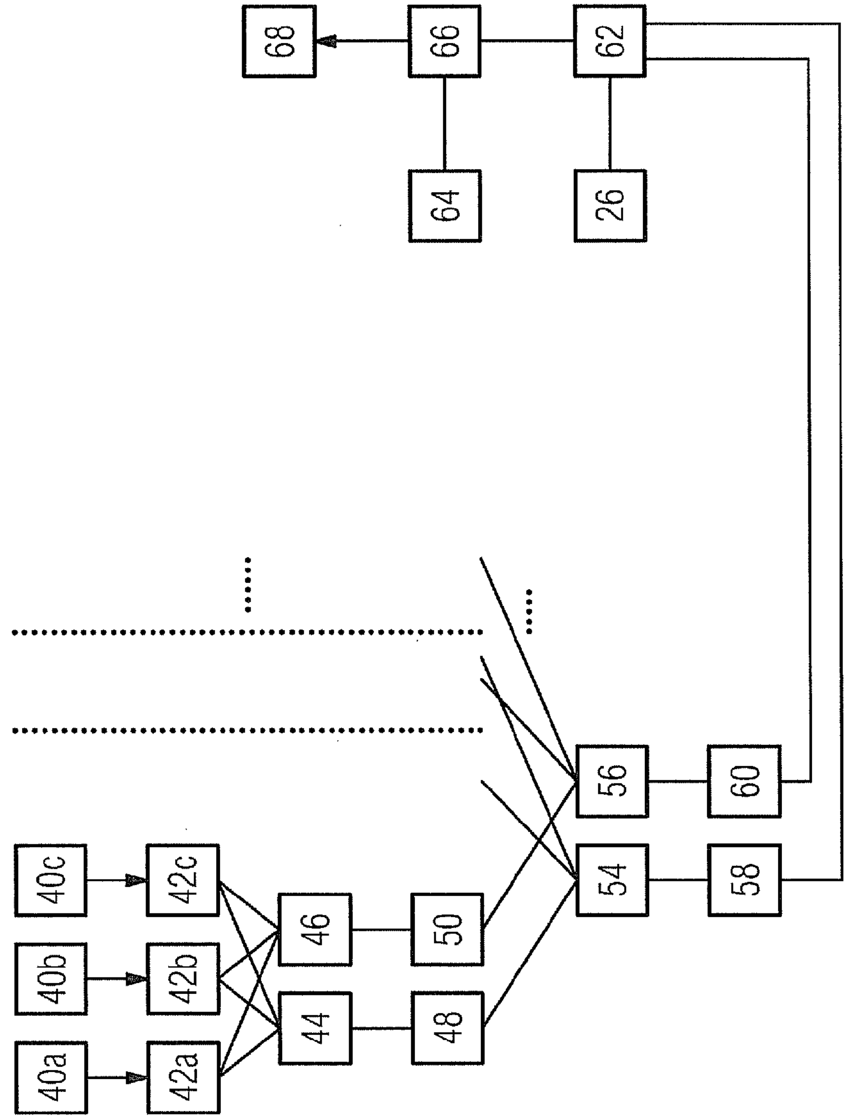
FIG. 3 shows a diagrammatic illustration of a method for predicting the additional power achieved in the event of compressor cleaning.

FIG. 3 shows diagrammatically the sequence of the method for determining the additional power, by the amount of which the operating power of the gas turbine 1 would be increased in the event of a cleaning of the compressor. For this purpose, first, the turbine inlet pressure 40*a*, the combustion chamber pressure loss 40*b* and the pressure loss between the surroundings and the compressor inlet 40*c* are measured as input characteristic quantities. A provisional value for the suction mass flow 42*a* is determined from the turbine inlet pressure 40*a* on the basis of Stodola's quantity/pressure equation. Furthermore, the pressure loss in the combustion chamber 40*b* and the pressure loss between the surroundings and the compressor inlet 40*c* are converted via a formulation with a constant resistance coefficient into provisional values for the suction mass flow 42*b* or 42*c*.

The different formulations initially deliver different provisional values for the suction mass flow 42*a*, 42*b* and 42*c*. With the secondary condition that all the suction mass flows should be identical, data validation is then carried out with reference to VDI2048. This corrects the measured values in terms of the specified uncertainties in such a way that the provisional values for the suction mass flow are virtually identical. The input characteristic quantities corrected in this way thus, on the one hand, give rise to validated values for the suction mass flow 44 and, on the other hand, the validated input characteristic quantities can be used as a basis for calculating the compressor efficiency 46.

Averaging then gives rise to comparatively exact values for the suction mass flow 48 and the compressor efficiency 50 at a specific time point 52. These measurements are recorded at a plurality of time points 52 and stored. In this case, the recorded measured values are in each case converted with the aid of a mathematical function, for example a polynomial, on the basis of ISO reference conditions (temperature 15° C., pressure 1.013 bar, air humidity 60%), so that the values recorded under different environmental conditions can be put into relation to one another. From the standardized values thus obtained for the suction mass flow 54 and compressor efficiency 56, a time profile of the suction mass flow 58 and compressor efficiency 60 can then be extrapolated by means of regression analysis. In order to ensure a sufficient regression quality, there should in this case be no fewer than ten measurement time points 52.

For both values, namely the suction mass flow and the compressor efficiencies, in each case the difference 62 between the values after the last offline scrub and the current time point is formed. Subsequently, each of the two results is multiplied by a factor. These factors are a result of float analysis, that is to say a comparison with structurally identical and/or structurally similar gas turbines 1. The corresponding data may in this case be supplied by an external database 26. Levels of probability are assigned to the result values on the basis of the respective statistical uncertainties.

The two results 62 are subsequently converted to a gas turbine power with the aid of characteristic numbers 64 specific to the gas turbine type. The prediction thus obtained for the additional power in the event of a cleaning of the compressor is finally delivered to the output 68.

To make a more accurate prediction of the additional power in the event of a cleaning of the compressor, the suction mass flow of the gas turbine is thus also taken into account, and in this case, to determine the suction mass flow, No energy balance is solved and there is no need for particulars relating to the gas turbine power and the fuel, in particular particulars relating to its calorific value and its mass flow. Owing to the prediction which thus has comparatively low uncertainty, the turbine operator can exactly determine the time point 34 for an offline scrub on the basis of operationally specific data. Thus, overall, a more cost-effective operation of the gas turbine is possible.

The invention claimed is:

1. A method for determining a suction mass flow of a gas turbine, comprising:

using as input characteristic quantities a turbine inlet pressure, a combustion chamber pressure loss, and a pressure loss between surroundings and a compressor inlet;

ascertaining for each input characteristic quantity a provisional value for a suction mass flow resulting in a first provisional value, a second provisional value and a third provisional value;

ascertaining for each provisional value a validated value by cross-balancing the first, second and third provisional values thereby receiving first, second and third validated values; and generating a characteristic quality of the suction mass flow of the gas turbine as an average value based upon the first, second and third validated values wherein the suction mass flow is determined without solving energy balances, without information relating to a fuel calorific value, and without information relating to a fuel mass flow.

2. The method as claimed in claim 1, wherein an operating power of the gas turbine of a single-shaft plant, the gas turbine and a steam turbine being arranged on one common shaft, is determined based upon the suction mass flow.

3. A method for diagnosing a gas turbine comprising a plurality of components, comprising:

predicting automatically an additional power, the additional power increasing an operating power of the gas turbine in an event of cleaning one of the components, wherein a suction mass flow of the gas turbine is used as a characteristic quantity in the predicting of the additional power, wherein the suction mass flow is determined according to a method, comprising:

using as input characteristic quantities a turbine inlet pressure, a combustion chamber pressure loss, and a pressure loss between surroundings and a compressor inlet;

ascertaining for each input characteristic quantity a provisional value for a suction mass flow resulting in a first provisional value, a second provisional value and a third provisional value;

ascertaining for each provisional value a validated value by cross-balancing the first, second and third provisional values thereby receiving first, second and third validated values; and generating a characteristic quantity of the suction mass flow of the gas turbine as an average value based upon the first, second and third validated values wherein the suction mass flow is determined without solving energy balances, without information relating to a fuel calorific value, and without information relating to a fuel mass flow.

4. The method as claimed in claim 3, wherein an operating power of the gas turbine of a single-shaft plant, the gas turbine and a steam turbine being arranged on one common shaft, is determined based upon the suction mass flow.

5. The method as claimed in claim 3, wherein the additional power in the event of a cleaning of the compressor is predicted.

6. The method as claimed in claim 3, wherein a compressor efficiency of the gas turbine is used as a characteristic quantity in the predicting of the additional power.

7. The method as claimed in claim 3, wherein the characteristic quantity is standardized to reference conditions.

8. The method as claimed in claim 3, wherein characteristic quantities of structurally identical gas turbines are used as comparative quantities in the predicting of the additional power.

9. The method as claimed in claim 3, wherein characteristic quantities of structurally similar gas turbines are used as comparative quantities in the predicting of the additional power.

10. The method as claimed in claim 3, further comprising:

providing a prediction of a time development of the characteristic quantity.

11. The method as claimed in claim 3, further comprising:

determining whether the gas turbine is shut down temporarily based upon the additional power and weighing up an overall outlay in economic terms in order to eliminate contamination.

12. The method as claimed in claim 11, further comprising:

ascertaining an optimal time point for a temporary shutdown.

* * * * *